(12) United States Patent　　(10) Patent No.: US 9,392,756 B1
Conrad, Jr.　　(45) Date of Patent: Jul. 19, 2016

(54) SELF-WATERING PLANTER ASSEMBLY

(71) Applicant: Michael L. Conrad, Jr., Bridgewater, NJ (US)

(72) Inventor: Michael L. Conrad, Jr., Bridgewater, NJ (US)

(73) Assignee: WaterWell Planters, Inc., Martinsville, NJ (US)

( * ) Notice: Subject to any disclaimer, the term of this patent is extended or adjusted under 35 U.S.C. 154(b) by 138 days.

(21) Appl. No.: 14/198,343

(22) Filed: Mar. 5, 2014

Related U.S. Application Data

(63) Continuation-in-part of application No. 13/920,988, filed on Jun. 18, 2013, and a continuation-in-part of application No. 14/043,814, filed on Oct. 1, 2013.

(51) Int. Cl.
*A01G 27/06* (2006.01)

(52) U.S. Cl.
CPC .................................... *A01G 27/06* (2013.01)

(58) Field of Classification Search
CPC ..... A01G 27/00; A01G 27/005; A01G 27/02; A01G 27/04; A01G 27/06; A01G 9/028
USPC ........... 47/65.5, 66.1, 79, 80, 81, 87, 48.5, 39
IPC ..................... A01G 27/00, 27/02, 27/04, 27/06, A01G 9/02
See application file for complete search history.

(56) References Cited

U.S. PATENT DOCUMENTS

| 3,958,366 | A | * | 5/1976 | Meyers | A01G 27/04 47/81 |
|---|---|---|---|---|---|
| 4,096,663 | A | * | 6/1978 | Silver | A01G 27/06 47/80 |
| 4,299,054 | A | * | 11/1981 | Ware | A01G 31/02 47/56 |
| 4,324,070 | A | * | 4/1982 | Swisher | A01G 27/04 47/81 |
| 4,369,598 | A | * | 1/1983 | Beckwith | A01G 31/06 220/4.27 |
| 4,805,343 | A | | 2/1989 | Patterson et al. | |
| 4,903,432 | A | * | 2/1990 | Velagaleti | A01G 27/04 47/80 |
| 4,962,613 | A | | 10/1990 | Nalbandian | |
| 5,404,672 | A | | 4/1995 | Sanderson | |
| 5,535,542 | A | * | 7/1996 | Gardner | A01G 27/04 47/18 |
| 5,930,951 | A | | 8/1999 | Wong | |
| D441,315 | S | | 5/2001 | Huffman | |
| 7,296,379 | B1 | * | 11/2007 | Peter | A47G 7/041 211/88.03 |
| 2008/0302002 | A1 | | 12/2008 | Schmidt | |
| 2009/0077873 | A1 | * | 3/2009 | Petersen | A01C 1/025 47/14 |
| 2011/0131879 | A1 | * | 6/2011 | Altendorfer | A01G 27/04 47/81 |
| 2011/0162272 | A1 | | 7/2011 | Junkeer | |

\* cited by examiner

*Primary Examiner* — Lisa Tsang
(74) *Attorney, Agent, or Firm* — M&B IP Analysts, LLC

(57) ABSTRACT

A self-contained, low-maintenance planter assembly used indoors or outdoors to provide prolonged self-watering of plants in a tray preferably supported by an easily height-adjustable frame insert positioned within the lower reservoir portion of a fluid-containing planter housing. Interior tray-lifting members are located adjacent to the tray's top edge, and the tray's bottom surface has perforations. Plant roots may be in growth/support medium distributed directly into the tray, or in drainable pots. Fluid-permeable material under the growth/support medium allows surplus rainwater to refill the planter housing via the tray's perforations in outdoor applications, while an overfill prevention hole in the planter housing prevents nutrient/liquid therein from entering the tray, with wicking member or members instead distributing nutrient/liquid upwardly to tray-supported plant roots. No tools or power/water connections are needed for assembly function. Applications include, but are not limited to, residential and commercial use, including hotels, convention centers, malls, and schools.

14 Claims, 4 Drawing Sheets

SELF-WATERING PLANTER ASSEMBLY

CROSS-REFERENCES TO RELATED APPLICATIONS

This patent application relates to two previously filed and still pending U.S. non-provisional patent applications filed by the same inventor herein. One has the Ser. No. 13/920,988, was filed on Jun. 18, 2013, and has the title of "Self-Watering Two-Piece Planter". The other has the serial number of Ser. No. 14/043,814, was filed on Oct. 1, 2013, and has the title of "Self-Watering Planter Insert Assembly". Since the inventions in all three applications have structural similarity to one another and common subject matter, the applicant herein respectfully requests a grant of domestic priority for this current patent application herein based upon his two previously filed U.S. Ser. Nos. 13/920,988 and 14/043,814.

BACKGROUND

1. Field of the Invention

This invention relates to apparatus and systems used to provide water and/or other nutrient/liquid to container-grown plants, specifically to a self-contained and self-watering planter assembly comprising a fluid-containing planter housing (preferably downwardly tapering for a traditional look and efficient stacking during transport and storage, but not limited thereto), a tray with a bottom surface having perforations and a size that allows it to fit within (or substantially within) the upper portion of the planter housing, a tray support sized and configured to fit within the bottom reservoir portion of the planter housing without taking up a large percentage of reservoir volume that could otherwise be used to hold nutrient/liquid, at least one layer of fluid-permeable material sized and positioned to cover the perforations in the tray's bottom surface and also having a hole for each wicking member used, and at least one wicking member having a minimum length dimension that allows it to extend between the bottom reservoir portion of the planter housing and the tray for one-way transport of nutrient/liquid from the planter housing to the tray, with additional length and positioning that allows the wicking member (or members collectively) to provide even distribution of nutrient/liquid within the tray.

The planter housing also has at least one overfill prevention hole through its side wall that defines the bottom reservoir portion of the planter housing by preventing nutrient/liquid therein from moving upwardly through tray perforations and into the plant root interior of the tray where it could oversaturate and injure plant roots. The tray also has interior lifting means near its top edge, preferably but not limited to two opposed handles configured for prompt and easy tray removal from, and replacement within, the upper portion of the planter housing with little disruption to the plants rooted in the tray. Use of the lifting members precludes the need for pliers or other grasping tools to provide a strong grip on the edges of the tray to lift it securely and in a balanced manner away from its position of use within the upper portion of the planter housing. Once the tray support (a frame insert as shown in the accompanying illustrations, or other) is placed within the planter housing, lowering of the tray into the planter housing causes it to become positioned atop the support, which preferably allows the tray to become situated imperceptibly within the planter housing's upper portion. Should a frame insert be used to support the tray and the elevation of the tray is considered to high for the type of plant used in the tray or the application, the legs of the frame insert (typically made from plastic for use in smaller planter housings) can be easily shortened (for example, by use of a cutting tool, garden shears, or a multiple scored-and-snap arrangement) to provide a lowered and more suitable tray elevation. In larger planter housings of the present invention and according to the type of plant grown and plant growth/medium used, a tray support with a sturdier construction may be required to support the increased weight of the plants and plant growth/support medium potentially present. In outdoor applications, the fluid-permeable material positioned under the plant growth/support medium, and over the tray's bottom perforations, allows surplus rainwater entering the tray, and not immediately needed by plant roots, to enter and refill the bottom reservoir portion of the planter housing via the tray's perforations and without soil infiltration into the nutrient/liquid held within the planter housing, with the at least one elongated wicking member being responsible for upward nutrient/liquid transfer from the planter housing and into the tray. Wicking members are typically presoaked prior to use to prevent delay in transfer of nutrient/liquid to the plants rooted in the tray. Also, plant roots may be in plant growth/support medium distributed directly into the tray, or in one or more drainable pots supported by the tray.

The planter assembly of the present invention is self-contained, low-maintenance, and provides a significantly longer self-watering time period for a plant (or plants) having roots supported in the tray than is obtainable from all known prior art self-watering systems in current use today for container-grown plants. Since the present invention planter assembly is self-contained, no connections for power or water are needed for its function, expanding the number of locations where it can be used. Inspection of the water level in the bottom reservoir portion of the planter housing may be conducted every few months by promptly and easily lifting and replacing the tray, with nutrient/liquid being added, or other maintenance action taken, according to need. Furthermore, planter housing and tray volumes in the present invention are selected to provide a nutrient/liquid-to-soil ratio between approximately 2:1 and approximately 4:1. In the most preferred embodiments of the present invention self-watering planter assembly where a nutrient/liquid-to-soil ratio of 4:1 is used, the self-watering time for plants grown indoors is at least two to three months. However, longer self-watering time periods have been demonstrated for plants with low fluid requirements and present invention planter assemblies located outdoors and situated to receive at least occasional rainwater replenishment. Applications include, but are not limited to, residential and commercial use, including hotels and other commercial buildings, hospitals, convention centers, college campuses and other educational facilities, shopping malls, lobbies, hallways and stair landings, decorative entrances to public and private buildings and other property, including parks and parking garages.

2. Description of the Related Art

People enjoy having plants as a part of their surroundings, but depending upon their location, container-grown plants may require a lot of maintenance. In heated and air-conditioned buildings, humidity is generally low, and more frequent watering of indoor plants is typically needed. Furthermore, indoor temperature, sunlight level, air drafts, and positioning near a door that subjects a plant to frequently changing local conditions, can have a significant affect on a plant's need for water and nutrients, and lead to additional time spent on planter monitoring and/or maintenance. Container-grown plants that are located outdoors and in patio areas can be subjected to even more variation in ambient temperature, sunlight level, and air movement, all of which will affect plant moisture requirements. The goal of the present invention is to provide a means of eliminating the daily labor that would otherwise be needed to keep container-grown plants and flowers properly irrigated for optimal appearance and growth, and also provide a significantly longer self-watering time period than is obtainable from all prior art self-watering systems currently sold for container-grown plants. While irrigation devices and systems are known for container-grown plants, no device or system is known with the same structure, wicking system, a removable tray with interior lifting means near its top edge, support means for the tray having a means for prompt and easy elevation adjustment, and/or all of the other features and advantages resulting from present invention structure and use.

The prior art invention thought to be the closest to the present invention is disclosed in U.S. Patent Application Publication 2008/0303002A1 to Schmidt (Dec. 11, 2008), which also provides a means of automated irrigation for a planter. However, there are many important structural differences between the Schmidt invention and the present invention, which allow the present invention structure to provide advantages that the Schmidt invention cannot. Although the present invention has residential application, one of the important considerations for the present invention planter assembly relates to its self-contained use in public areas. Thus, design considerations for the present invention include inconspicuous/discreet features and components that are less likely to be disturbed by the curious or unkind public, including reservoir replenishment via tray perforations instead of the exposed irrigator 30 and fill tube 52 of the Schmidt invention that in FIG. 5 of its disclosure are shown to extend above the plant/growth medium. Toward this same goal, present invention tray lifting handles are made unobtrusive and do not extend upwardly above the top edge of the tray.

In addition, the embodiment of the Schmidt invention illustrated in FIG. 5, with its plant substrate above its water supply volume, shows two vertically-oriented spacers 51 and 51' positioned in the bottom of a planter, and a horizontally-extending plate 50 supported upon the spacers 51 and 51' that define a bottom volume usable as a water supply volume, while the space above plate 50 holds the substrate for supporting plant roots. Without perforations in its plate 10, the Schmidt invention cannot take advantage of rainwater replenishment for its reservoir to provide extended maintenance-free use, one of the main goals of outdoor embodiments of the present invention. The Schmidt invention also uses a moisture sensor connected to a miniature irrigator 30 that cycles water from the water supply volume to the substrate only when a minimum moisture threshold is reached. Instead, the wicking member (or members) of the present invention provide even and sufficient moisture for optimal growth of plants in the tray until moisture saturation is reached, thus over-watering is prevented and at a reduced cost compared to the more complex structure of the Schmidt invention.

Furthermore, Schmidt's fill tube 52 provides a small diameter conduit for water replenishment (much less surface area than the present invention provides to take advantage of rainwater replenishment for its nutrient or water-filled reservoir), and the proportion of water to substrate in the embodiment of the Schmidt invention shown in FIG. 5 is approximately 1:1. In contrast, the present invention has a preferred fluid-to-soil preferred ratio is 4:1, with a minimum ratio of 2:1, which increases the length of time between inspections and maintenance. Furthermore, the Schmidt growth medium, water, spacers 51 and 51', and horizontal plate 50 are all separate elements assembled into a planter, and each would have to be individually removed therefrom when cleaning of the planter is needed or desired, and soil and plant/root disruption would also occur. In contrast, removal and replacement of the present invention tray and frame insert are fast and easy for maintenance/inspection purposes, saving material and labor cost in commercial applications, a benefit not provided by the Schmidt invention. In addition, legs of the easily height-adjustable frame insert when used in the present invention planter housing to support the plant-holding tray, may be cut in a minute or less for repositioning of the tray, while dismantling the plate and spacers of the Schmidt invention would take much longer to substitute new spacers having a different configuration or size. Furthermore, the overfill prevention hole in the side of the present invention planter housing defines the top of the reservoir and the maximum amount of nutrient/liquid that can be stored. In contrast, in the Schmidt invention its non-perforated plate 50 defines the top of its reservoir. No other planter assembly is known that functions in the same manner as the present invention, has the same structure disclosed herein, or provides all of the present invention's important advantages.

BRIEF SUMMARY OF THE INVENTION

It is the primary object of this invention to provide a self-contained, low-maintenance, and self-watering planter assembly for facilitated plant growth that provides a significantly longer self-watering time period than is obtainable from most prior art self-watering systems in current use today for container-grown plants and eliminates the daily labor that would otherwise be needed to keep container-grown plant foliage and flowers properly irrigated. It is a further object of this invention to provide a self-watering planter assembly for facilitated plant growth that permits reservoir fluid replenishment while plants and their growth/support medium remain undisturbed in their usual/designated positions. Another object of this invention is to provide a self-watering planter assembly for facilitated plant growth that is made from strong, durable, and non-corroding materials, and has strong/stable tray support. It is also an object of this invention to provide a self-watering planter assembly for facilitated plant growth that allows fast and easy tray removal from the planter housing with which it is associated, and also allows fast and easy re-installation of the tray into its desired position of use. A further object of this invention is to provide a self-watering planter assembly for facilitated plant growth that has tray construction allowing excess rainwater to pass through it and enter the supporting reservoir beneath it for rainwater replenishment of the reservoir and prolonged self-watering time periods in outdoor applications. In addition it is an object of this invention to provide a self-watering planter assembly for planters having an option for easy adjustment of tray elevation according to the type of plant to be supported by the tray. It is also an object of this invention to provide a self-watering planter assembly for facilitated plant growth which has a tray constructed for holding one or more drainable plant growth pots, or in the alternative may contain growth/support medium distributed directly into the tray for plant support, although having plant roots directly in the tray and supported by soil or other growth/support media is most preferred. It is a further object of this invention to provide a self-watering planter assembly for facilitated plant growth having irrigation means that allows even distribution of nutrient/liquid throughout the tray. In addition, it is an object of this invention to provide a self-watering planter assembly for both indoor and outdoor applications, as well as residential and commercial use, such as but not limited to shopping malls, lobbies, parks, decorative entrances to public and private buildings and property, parking garages, commercial buildings, hotels, hospitals, convention centers, educational facilities, and college campuses.

The present invention, when properly made and used, provides a self-contained planter assembly that allows self-watering of a plant or plants positioned with their roots supported by a tray that is removably positioned upon a support in a reservoir below the tray. The reservoir has a proportionately larger fluid-holding interior volume than the tray, to eliminate much of the daily labor that would otherwise be needed to keep container-grown plant foliage and flowers properly irrigated. Since the proportion of nutrient/liquid-to-soil in the present invention is at least 2:1, and most preferably approximately 4:1, the self-watering time for plants grown indoors is extended to at least two to three months, and longer for plants with low fluid requirements and planter inserts used outdoors that experience rainwater refill, resulting in a significantly longer self-watering time period than can be achieved with all known self-watering systems for container-grown plants in current use today. The opposed, inwardly-directed, and inconspicuous/discreet protrusions positioned near the upper edge of the tray can be used as handles to provide easy and immediate lifting and lowering of the tray. Multiple sizes and shapes for trays and reservoirs are contemplated according to plant needs, including substantially circular cross-sectional configurations, that of a rectangular planter box, and/or other non-circular and non-rectangular cross-sectional configurations such as but not limited to hexagons and octagons. However, the traditional planter shape having a circular cross-section and downwardly tapering sides is most preferred. Plant roots may be in drainable pots supported by the tray, or in soil or other growth/support media distributed directly into the tray. Furthermore, since the volume of support/growth media used in trays of the present invention defines the boundary of plant root growth, transfer of maturing plants to larger planters and in-ground sites is also facilitated. An optional lower drain opening in the reservoir can be capped or otherwise sealed until needed for use with a threaded cap, plug, or other similar means, should an application require a drain opening for maintenance purposes, such as might be indicated by a need for winterizing very large embodiments of the present invention. Furthermore, although its reservoir may need periodic water/nutrient replenishment every few months, no municipal power or water supply connections are needed for proper function of the self-contained present invention. At least one wicking member extends upwardly from the bottom reservoir portion of the planter housing and into the supported tray via one or more perforations in the tray's bottom surface, and the wicking member or members are distributed within the tray for providing nutrient/liquid evenly to differing portions of the tray. The tray support used is also configured to minimize the amount of space occupied in the bottom portion of the planter housing, to achieve a nutrient/liquid-to-soil ratio as close to 4:1 as possible in most applications. Fluid-permeable material is placed on the tray's perforated bottom surface under the wicking member or members to prevent soil infiltration downwardly into the nutrient/liquid in the reservoir. Depending on the downward flow rate of rainwater desired in outdoor applications, one or more layers of fluid-permeable material may be used, and a combination of fluid-permeable materials may also be used.

Furthermore, in the most preferred embodiments of the present invention self-watering planter assembly soil or plant growth support media is often mounded toward center of the tray, although center mounding is not critical. Thus, in indoor and outdoor applications, the nutrient/liquid needed by plants daily is continuously transferred upwardly from the reservoir into the tray by the wicking member or members and distributed upwardly through the growth/support medium containing plant roots without over-watering, and any excess rainwater entering the tray in outdoor applications and not immediately needed by plant roots moves downwardly via gravity through the fluid-permeable material and also through the bottom surface perforations of the tray into the reservoir for storage and subsequent plant irrigation use via the wicking member or members. In addition to other factors, the number of wicking members varies according to the size of the tray, the ambient temperature and other ambient conditions (such as but not limited to drafts and wind) in the vicinity of the tray, as well as the size, age, number, type, and variety of plants grown in the tray. Also, the reservoir typically has one or more overfill prevention holes to prevent rising nutrient/liquid in the reservoir from reaching a level that could block the downward flow of excess liquid in the tray through its perforations, which if blocked would lead to saturation of plant roots that could eventually injure them. Applications include, but are not limited to, use for daily self-watering of plants in and around residential homes, shopping malls, commercial buildings, hotels, convention centers, and business and educational campuses.

The present invention self-watering planter assembly requires no decorative enhancement, although it may be made in a variety of colors or have various decorative surface texture patterns, designs, imprinted information, decals, informational stickers, and/or other decoration or attachment desired for marketing purposes. Depending upon the type and size of plants grown therein, indoor use of the present invention planter assembly may permit minimum maintenance-free periods of several months, with outdoor use permitting even longer maintenance-free periods when the planter assembly is positioned to benefit from rainwater replenishment, and if it rains often enough, no other water refill of its reservoir will be required. Another advantage of the planter assembly is that no municipal power or water supply connections are needed for its function, allowing it to service a wider variety of locations. Since its perforations allow surplus rainwater to exit the present invention tray via gravity and the wicking member or members only bring fluid into the tray from the reservoir until fluid saturation of the soil or other growth medium occurs, over-watering of plants grown in the tray is not possible, an important objective and advantage of the present invention so that plant roots are not harmed. Although contemplated applications of the present invention planter assembly include use in and around public places, indoor and outdoor residential use by families and individuals are also considered important applications of the present invention and within its contemplated scope. Advantages of the present invention planter assembly include structure that provides a constant/steady supply of water and fertilizer to plants, easy cleaning, no municipal power or water supply connections, significantly longer self-watering time periods than is currently known for prior art self-watering containers, durable construction, easy tray elevation adjustment, and easy/prompt installation and assembly.

COMPONENT LIST

Figure 1:
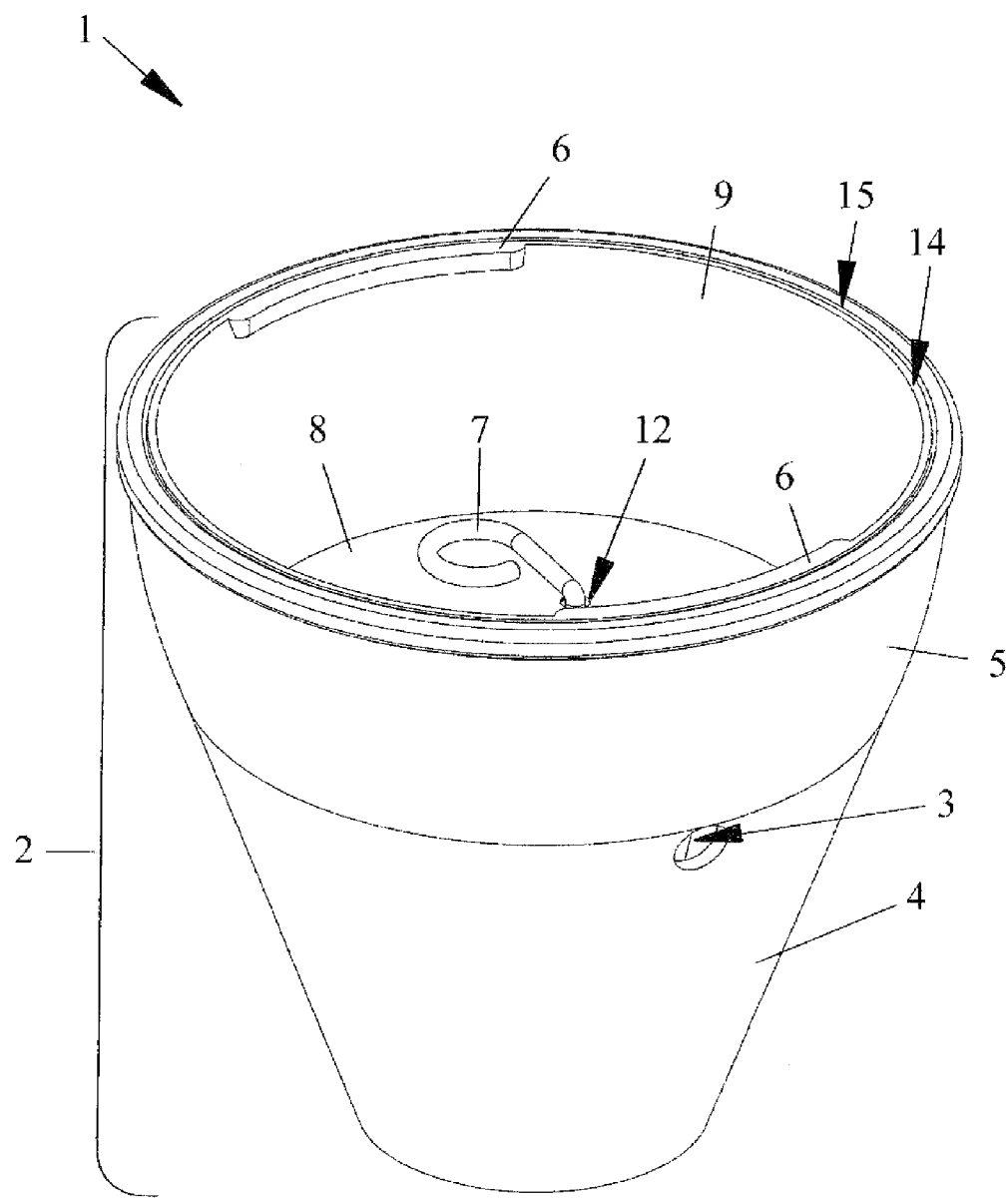
FIG. 1 is a side view of the most preferred embodiment of the present invention self-watering planter assembly in an assembled configuration and showing its tray situated within the top portion of the planter housing, the top edge of the tray not extending above the top edge of the planter housing, the tray also having opposed interior lifting handles near its top edge, the planter housing having at least one overfill prevention hole through its side wall that defines a bottom reservoir portion, and one wicking members is also shown on top of a fluid-permeable material covering the tray's bottom surface.

1—most preferred embodiment of self-contained and self-watering planter assembly
2—planter housing of planter assembly 1
3—overfill prevention hole in planter housing 2 that defines the bottom portion 4 of planter housing 2 serving as a nutrient/liquid reservoir
4—bottom portion 4 of planter housing 2 serving as a nutrient/liquid reservoir
5—upper portion of planter housing 2 in which tray 9 is situated when atop frame insert 10
6—interior handle or lifting member (located adjacent to the top edge 14 of tray 9)
7—wicking member (used to draw nutrient/liquid from the lower portion of planter housing 2 and move it upwardly into tray 9, it is preferably pre-soaked prior to use)
8—fluid-permeable material (one or more layers can be used to adjust the rate of gravity flow for downward travel of excess rainwater into the lower/reservoir portion 4 of planter housing 2)
9—removable tray
10—frame insert (situated in the bottom portion 4 of planter housing 2 for support of tray 9)
11—perforations in the bottom surface of tray 9 (used as drain holes for rainwater entering tray 4 that cannot be immediately used by plants, to transfer that surplus rainwater into the lower portion of planter housing 2 for later upward movement via wicking member or members 7 into tray 9)
12—hole in fluid-permeable material 8 used for insertion of a wicking member 7 (so that one of its ends remains in the bottom reservoir 4 portion of planter housing 2 and its opposite end is placed in tray 9)
13—leg of frame insert 10 (can be shortened to lower elevation of tray 9 when desired)
14—top edge of tray 9
15—top edge of planter housing 2
16—bottom interior surface of planter housing 2

DETAILED DESCRIPTION OF PREFERRED EMBODIMENTS

Figure 2:
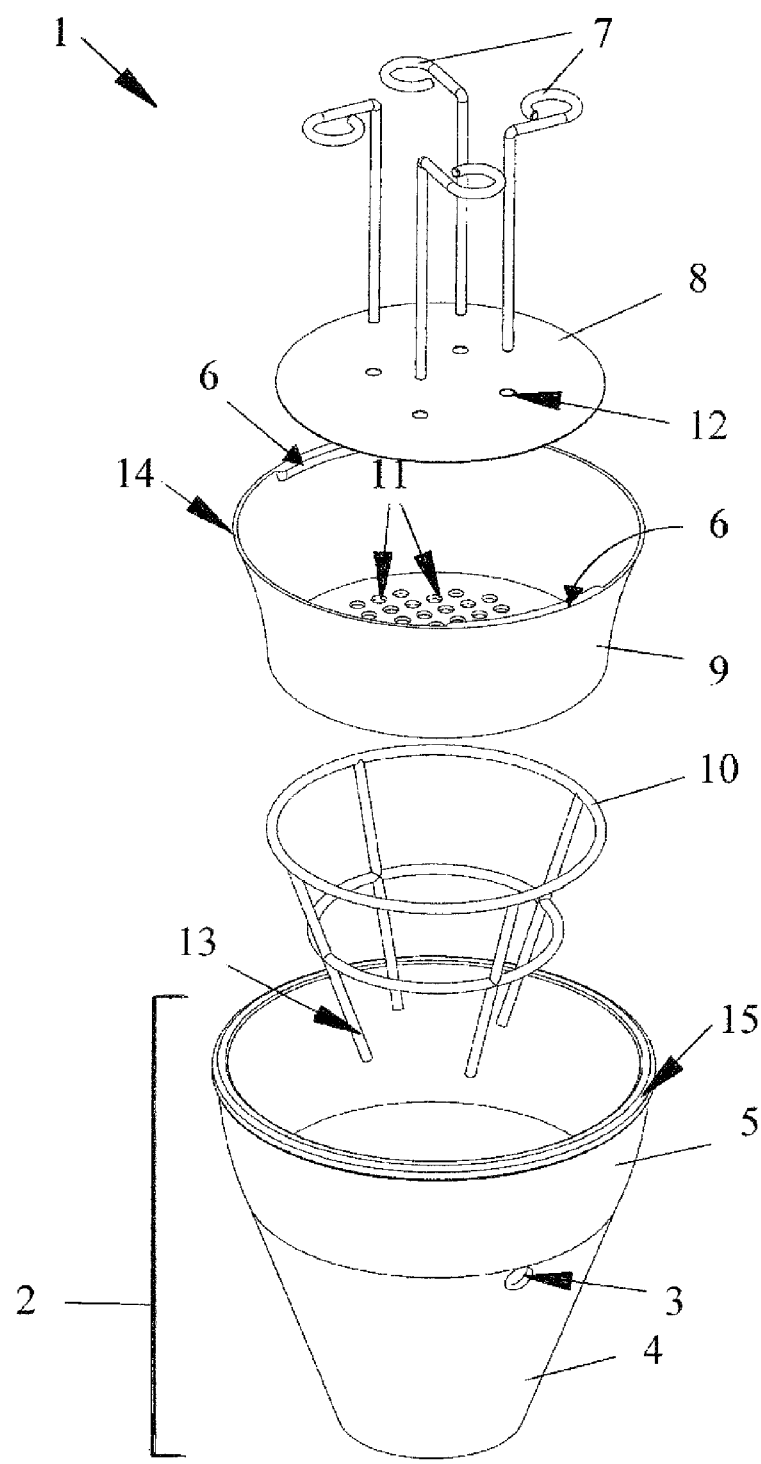
FIG. 2 is an exploded view of the planter assembly in FIG. 1 showing four partially coiled wicking members each having a downwardly-extending end of sufficient length to reach the bottom interior surface of the planter housing shown at the bottom of FIG. 4, fluid-permeable material positioned under the wicking members and having four holes each used for insertion of a different wicking member, a tray having a perforated bottom surface and opposed interior lifting handles near its top edge, the tray also configured to receive the fluid-permeable material and allow the wicking members to pass through its bottom surface, a frame insert that supports the tray within the planter housing shown below it, and the reservoir in the bottom portion of the planter housing defined by at least one overfill prevention hole through its side wall.
Figure 3:
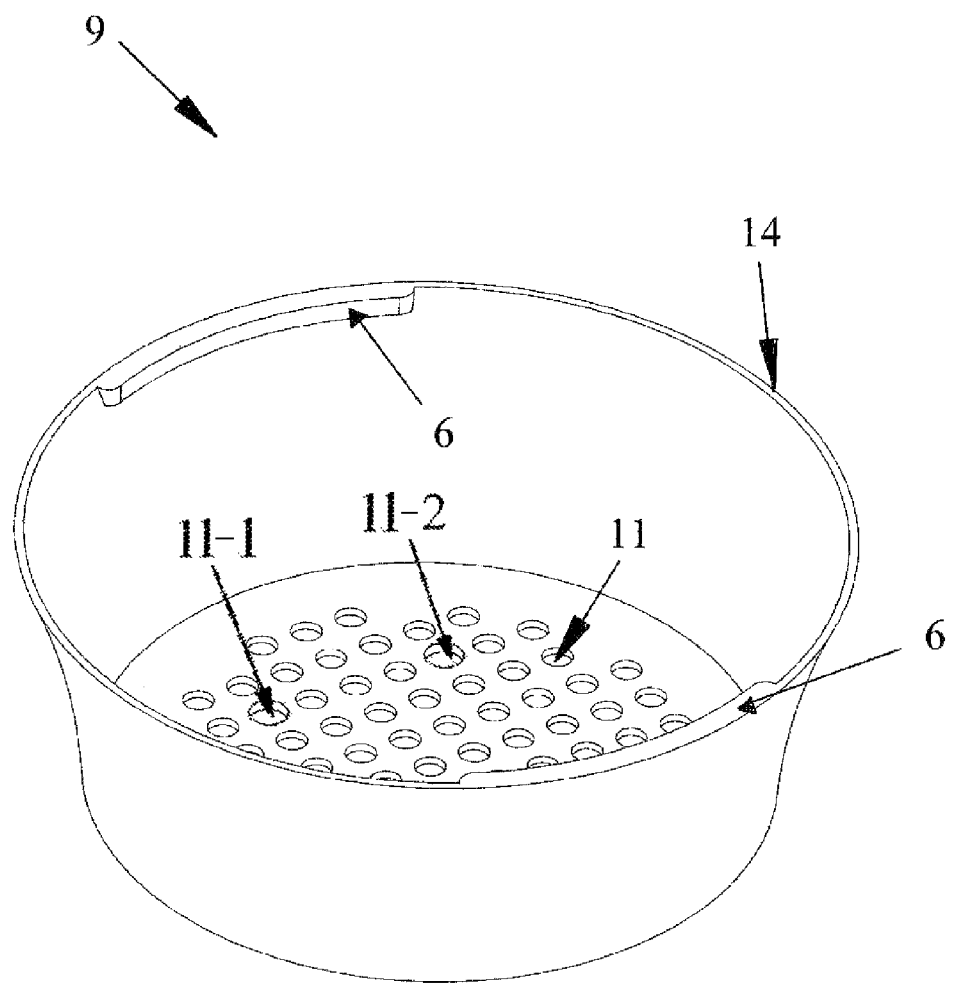
FIG. 3 is a perspective view of the tray in the most preferred embodiment of the present invention planter assembly showing its substantially perforated bottom surface, opposed interior lifting handles near its top edge, and its preferred downwardly tapering and slightly concave sides that are a cost-saving feature that allow it to fit into more than one size of planter housing.
Figure 4:
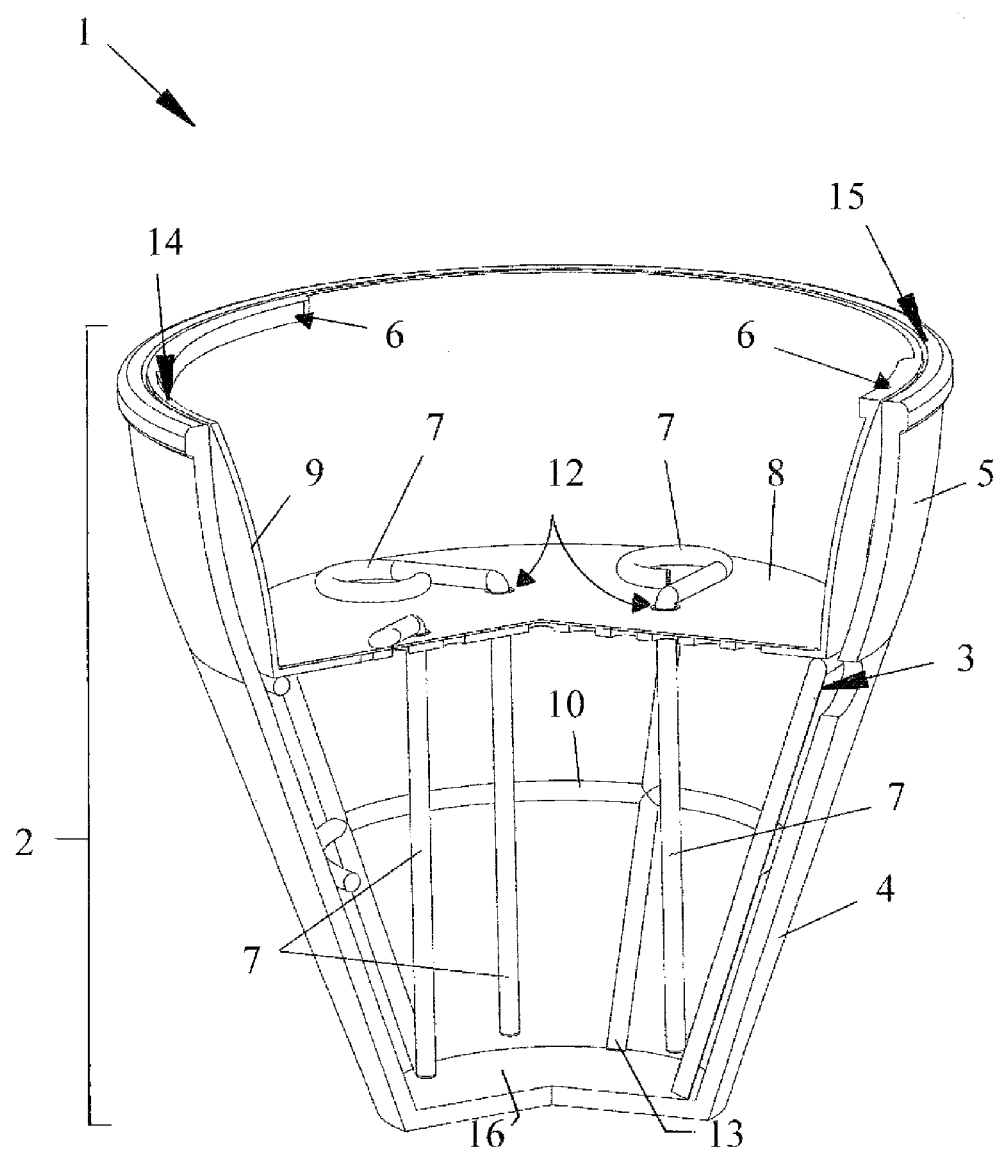
FIG. 4 is a sectioned view of the most preferred embodiment of the present invention planter assembly in an assembled condition and showing the tray atop the frame insert and both tray and frame insert positioned within the planter housing, with the frame insert substantially within the bottom portion of the planter housing that functions as a reservoir but with its top surface positioned above the overfill prevention hole that defines the top of the reservoir portion of the planter housing, and three wicking members positioned atop the fluid-permeable material covering the perforations in the tray's bottom surface.

FIGS. 1-4 show differing views of the most preferred embodiment of the present invention planter assembly 1 which provides a significantly longer self-watering time period than is obtainable from all known self-watering and self-contained systems in current use today for container-grown plants. While FIGS. 1, 2, and 4 show tray 9 and planter housing 2, FIG. 3 shows an enlarged view of tray 9. Although the illustrations accompanying this disclosure show a self-watering planter assembly 1 having a circular cross-sectional configuration and its sides downwardly tapering, and such structure is preferred for the traditional planter look and the efficient stacking during transport and storage provided, planter housing 1 may have any size or shape, including the cross-sectional configuration of a circle, rectangle, hexagon, or other regular or non-regular polygon, or an irregular arcuate perimeter configuration. In addition, the present invention requires no decorative enhancement, although it may be made in a variety of colors or have various decorative surface texture patterns, designs, imprinted information, decals, informational stickers, and/or other decoration or attachment desired for marketing purposes. Applications include, but are not limited to, daily self-watering of plants in and around residential homes, shopping malls, commercial buildings, hotels, convention centers, and college campuses. Advantages of the present invention planter assembly 1 include structure that provides a constant/steady supply of water and fertilizer to plants, easy cleaning, no need for limitation to locations providing municipal power or water supply connections, significantly longer self-watering time periods, durable construction, and easy/prompt installation and assembly.

FIG. 1 is a side view of the most preferred embodiment of the present invention self-watering planter assembly 1 in an assembled configuration and shows planter assembly 1 comprising a tray 9 configured for holding plants and their growing/support medium, (or in the alternative potted plants in drainable containers) positioned within the upper portion of a planter housing 2, with the top edge 14 of tray 9 at about the same elevation as than the top edge 15 of planter housing 2. Such positioning of top edge 14 relative to top edge 15 is typical, but not critical. Although not clearly shown in FIG. 1, but shown in the sectional view of FIG. 4, planter housing 2 has a closed bottom surface 16 and side walls that define a fluid-holding bottom portion 4. As shown in FIG. 1, the planter housing 2 of planter assembly 1 has a top end with a greater width dimension than its bottom end, which is not critical, but preferred for a traditional planter look and the efficient stacking during transport and storage. FIG. 1 also shows planter housing 2 having an overfill prevention hole 3 that defines the fluid-holding capability of bottom reservoir portion 4. As shown in FIG. 4, overfill prevention hole 3 must be positioned below the interface of tray 9 and its frame (or other) support 10, so that nutrient/liquid (not shown) in the bottom reservoir portion 4 of planter housing 2 will not flow upwardly through the perforations 11 in tray 9 and saturate plant roots, potentially injuring them. Although FIG. 1 shows the outer surface of planter housing 2 unadorned, it may display color and/or textured markings, decorative patterns, and/or other decorative or informational markings. In addition, FIG. 1 shows tray 9 having opposed handles 6 situated near the top edge 14 of tray 9, which are used to remove and reinstall tray 9 in its usable position relative to planter housing 2 without the use of any grasping tools. The handles 6 should be sturdy enough to lift tray 9 while it is supporting the additional weight of plants and needed support/growth medium (not shown). The planter assembly 1 shown in FIG. 1 can also be used indoors or outdoors. Perforations 11 in the bottom surface of tray 9 are not visible in FIG. 1, as they are covered by fluid-permeable material 8. In addition, FIG. 1 shows one wicking member 7 positioned atop fluid-permeable material 8, and the hole 12 through fluid-permeable material 8, that allows the wicking member 7 shown to extend downwardly into the bottom reservoir portion 4 of planter housing 2. Although not critical, it is preferred that wicking members are presoaked in water or nutrient/liquid prior to use. Plant roots may be in growth/support medium distributed directly into the tray, or in drainable pots (not shown). The fluid-permeable material 8 is positioned under the plant support medium (not shown) held by tray 9, and allows surplus rainwater to refill the bottom reservoir portion 4 of planter housing 2 via the perforations 11 of tray 9 in outdoor applications without infiltration of plant support medium downwardly into planter housing 2. Furthermore, as can be seen in FIG. 1, no connections for power or water are needed for function of planter assembly 1.

In addition, the size and shape of handles 6 are not critical as long as a good grip is provided for balanced lifting of tray 9. Furthermore, in the alternative, although not shown and not preferred, it is considered within the scope of the present invention for handles 6 to be in the form of a continuously extending and inwardly-extending rim. Also, FIG. 1 only shows one overfill prevention hole 3 but in larger planter housings 2 more than one overfill prevention hole 3 may be used. The size and placement of overfill prevention holes 3 can also be different from that shown in FIG. 1 as long as it maximizes the fluid-holding capacity of planter housing 2 while concurrently prevents rising nutrient/liquid in planter housing 2 from blocking flow of excess rainwater (not shown) downwardly through the perforations 11 (see FIGS. 2 and 3) in the bottom surface of tray 9 via gravity into planter housing 2. Also, although not limited thereto, the most preferred embodiments of the present invention self-watering planter assembly 1 comprise a base-member-to-tray volume that is approximately 4:1, although a minimum base-member-to-tray volume of least 2:1 is also contemplated. When a 4:1 nutrient/liquid-to-soil ratio is used, the self-watering time for plants grown indoors is at least two to three months, and longer self-watering time periods have been demonstrated for plants with low fluid requirements and those planter insert assemblies located outdoors and situated to receive at least occasional rainwater replenishment. In addition to structural considerations needed for tray 9 support, the structure and materials used for planter housing 2 must also be suitable for holding fluid/nutrient for extended periods of time without warping, sagging, or other structural alteration or modification. The structure and materials used for tray 9 must also be suitable for extended exposure to fluid/nutrient without warping, sagging, or other structural alteration or modification, and those used in outdoor applications must be ultraviolet (UV) light resistant.

FIG. 2 is an exploded view of the planter assembly 1 in FIG. 1 that shows four wicking members 7 having a each downwardly-extending end of sufficient length to reach the bottom interior surface 16 of planter housing 2 shown in FIG. 4. The top coiled ends of the wicking members 7 shown in FIG. 2 is merely representative, and the manner in which the top portions of wicking members 7 are positioned across fluid-permeable material 8 may be different from that shown. FIG. 2 further shows fluid-permeable material 8 positioned under wicking members 7 and having four holes 12 each used for insertion of a different wicking member 7. In addition, FIG. 2 shows tray 9 having a bottom surface with multiple perforations 11. It is contemplated for each hole 12 in fluid-permeable material 8 to become aligned with a different perforation 11 in tray 9 to allow the wicking member passing through hole 12 to also pass through the bottom surface of tray 9, so that all wicking members used can extend downwardly beyond tray 9 to (or close to) the bottom surface 16 of planter housing 2. The size of perforations 11, as well as their placement/positioning in tray 2, is not limited to that shown in FIG. 2, and the perforations 11 aligned with a hole 12 may have a diameter dimension greater than other perforations 11 that are not aligned with a hole 12. FIG. 2 also shows tray 9 having opposed interior lifting handles 6 near its top edge 14 and a configuration sized and shaped to receive the fluid-permeable material 8. The frame insert 10 under tray 9 in FIG. 2 supports tray 9 while both are positioned within planter housing 2. When frame insert 10 is made of plastic, the legs 13 of frame insert 10 may be optionally trimmed to lower the elevation of tray 9 according to need using a cutting tool, such as gardening shears. In the alternative, although not shown, a scored-and-snap shortening of the legs 13 may be used to lower the elevation of tray 9 within planter housing 2. Frame insert 10 should take up minimal space within the bottom reservoir portion 4 of planter housing 2 so that a maximum amount of space within the bottom reservoir portion 4 of planter housing 2 can be used to hold nutrient/liquid for plant irrigation. However, for larger planter housings 2, a sturdier support (not shown) may be used in place of frame insert 10 to bear the additional weight of plants and their growth/support medium. Below frame insert 10, FIG. 2 shows planter housing 2 with an unadorned exterior, a preferred rounded top edge 15, and one overfill prevention hole 3. Although FIG. 2 shows planter housing 2 having only one overfill prevention hole 3 through its side wall, which is preferred, more overfill prevention holes 3 can be present and they may have differing size, shape, and elevation from that shown in FIG. 2. The elevation of overfill prevention hole or holes 3 must be determined to prevent the fluid/nutrient in planter housing 2 from blocking the downward gravity-assisted flow of surplus/excess fluid/nutrient from tray 9, through fluid-permeable material 8, and into planter housing 2.

Although FIG. 2 shows planter assembly 1 having four wicking members 7, more or less than that number can be used, each extending into planter housing 2 to draw nutrient/liquid (not shown) from planter housing 2 upwardly into soil or other plant growing medium (not shown) supported by tray 9 around plant roots (not shown). Whether one or multiple wicking members 7 are used, it is preferred that they are distributed substantially across material 8 for even distribution of nutrient/liquid to plant roots. Furthermore, the configuration and width dimension of wicking members 7 used as a part of planter assembly 1 may vary from that shown in FIG. 2. The thickness of fluid-permeable material 8, the number of layers used, and the type of fabric or other material or materials used as a part of fluid-permeable material 8 may vary according to the flow rate of nutrient/liquid needed from planter housing 2 to tray 9 to properly irrigate plants supported by tray 9. Plants may be in drainable pots supported by tray 9, or plant roots may be established in a growth or support medium (not shown) distributed within the tray-like interior surface of tray 9. In addition, it is contemplated for preferred embodiments of the present invention to be manufactured in several sizes to accommodate differing sizes and arrangements of container-grown plants. It is also preferred that all materials used in planter assembly 1 be non-toxic, water resistant, and unaffected by extended exposure to soil and nutrient/liquid. Resistance to breakdown from ultraviolet (UV) radiation is also a desirable material consideration for tray 9 and planter housing 2, although not critical unless outdoor applications in full sun are contemplated.

FIG. 3 is an enlarged perspective view of tray 9 in the most preferred embodiment of the present invention planter assembly 1 that shows its bottom surface having a plurality of perforations 11 substantially covering its bottom surface. Perforations 11 are used as drain holes for transfer of surplus rainwater entering tray 9 and not immediately usable by plants (not shown) into planter housing 2 for later upward movement in a metered fashion via a wicking member or members 7 into tray 9 that does not permit over-watering of plant roots. In contrast, one or more perforations 11 may be larger in diameter for accommodating thicker wicking members 7, if used. As seen in FIG. 3, perforations 11-1 and 11-2 are enlarged respective of the other perforations 11. A hole 12 in fluid-permeable material 8 is complementary in size, shape, and alignment to that of a correspondingly positioned perforation or perforations 11 used for passage of a wicking member 7 through both invention components (tray 9 and fluid-permeable material 8) and into planter housing 2. Furthermore, the size, number, placement, and spaced-apart distances of perforations 11 in the bottom surface of tray 9 may vary from that shown in FIG. 3. In addition, the wall thickness, wall height, and interior volume of tray 9 may vary according to the type of plants contemplated for its use. Also, the number, location, size, and shape of handles 6 are not limited to that shown in FIG. 3. In addition, soil or plant growth support media may be mounded toward center of tray 9, although center mounding is not critical. Thus, in many embodiments of planter assembly 1 the top edge 14 of tray 9 does not extend above the top edge 15 of planter housing 2. Also in FIG. 3, the sidewalls of tray 9 appear to have a slight concave appearance, which is preferred but not critical, and helps tray 9 to fit in a greater variety of sizes of planter housings 2.

FIG. 4 is a sectioned view of the most preferred embodiment of the present invention planter assembly 1 in an assembled condition and showing tray 9 atop frame insert 10, and both tray 9 and frame insert 10 positioned within planter housing 2. The legs 13 of frame insert 10 engage the bottom interior surface 16 of planter housing 2, and frame insert 10 is positioned substantially within the bottom portion 4 of planter housing 2 that functions as a reservoir. However, by necessity the top surface of frame insert 10 must be positioned above the overfill prevention hole 3 that defines the top of the bottom reservoir portion 4 of planter housing 2, and three of the four wicking members 7 shown in FIG. 2 are positioned atop the fluid-permeable material 8 covering the perforations 11 (visible under the front edge of fluid-permeable material 8, but unmarked) in the bottom surface of tray 9. In addition, the holes 12 through fluid-permeable material 8 are visible and marked in FIG. 4.

I claim:

1. A self-contained and self-watering planter assembly providing reduced maintenance for container-grown plants, said planter assembly comprising:

a planter housing with an upper portion having a top edge, a bottom reservoir portion with a bottom interior surface, and at least one overfill prevention hole limiting a fluid volume of said bottom reservoir portion;

a tray with a bottom surface having a plurality of perforations and a dimension allowing said tray to be positioned substantially within said upper portion of said planter housing, said tray also having a top edge and interior handle means adapted for lifting said tray and located adjacent to said tray top edge;

a tray support sized and configured for positioning within said bottom reservoir portion of said planter housing, said tray support also having a top surface and downwardly converging legs positioned beneath said to surface, said tray support having a height dimension such that said top surface is positioned above said at least one overfill prevention hole in said planter housing, wherein said tray is supported only by said tray support;

at least one layer of fluid-permeable material sized and positioned to cover said perforations in said bottom surface of said tray, said at least one layer of fluid-permeable material having at least one hole aligned with one of said perforations in said tray; and a plurality of wicking members with a different wicking member extending through each of said at least one hole of said at least one layer of fluid permeable material and the perforation aligned therewith, each said wicking member also having an upper end, a lower end, and a length dimension sufficiently large for extension between said tray and said bottom surface of said bottom reservoir portion of said planter housing and providing one-way transport of liquid from said planter housing to said tray, each said wicking member also having an additional length dimension on said upper end and positioning thereof allowing substantially even distribution of fluid within said tray, wherein once said tray support is placed within said planter housing, and said tray is lowered into said planter housing and positioned on said top surface of said tray support and situated substantially within the planter housing's upper portion, said fluid-permeable material covering said perforations in said tray allows excess fluid in said tray to move via gravity downwardly into said bottom reservoir portion of said planter housing, while said plurality of wicking members extending from said tray downwardly into said bottom reservoir portion draws fluid therein upwardly into said tray for continued self-watering of at least one plant supported by said tray without over-saturation of plant roots, with said at least one overfill prevention hole in said reservoir allowing exit of surplus fluid in said planter housing and preventing fluid in said bottom reservoir portion from moving upwardly and contacting said tray.

2. The planter assembly of claim 1 wherein said tray has a soil-holding capacity, and said fluid volume of said bottom reservoir portion of said planter housing is approximately four times larger than said soil-holding capacity.

3. The planter assembly of claim 1 wherein said tray has a soil-holding capacity, and said fluid volume of said bottom reservoir portion of said planter housing is approximately two times larger than said soil-holding capacity.

4. The planter assembly of claim 1 wherein said tray has a soil-holding capacity, and said fluid volume of said bottom reservoir portion of said planter housing at a minimum is approximately two times larger than said soil-holding capacity, and said fluid volume of said bottom reservoir portion at a maximum is approximately four times larger than said soil-holding capacity.

5. The planter assembly of claim 1 wherein said tray support has a frame construction configured to minimize fluid displacement in said fluid volume of said bottom reservoir portion of said planter housing.

6. The planter assembly of claim 1 wherein at least one of said perforations in said bottom surface of said tray is enlarged to accommodate insertion therethrough of said plurality of wicking members.

7. The planter assembly of claim 1 wherein said interior handle means in said tray do not extend above said top edge of said tray.

8. The planter assembly of claim 7 wherein said planter housing has a downwardly tapering configuration.

9. The planter assembly of claim 1 wherein the legs can be cut to reduce the height dimension, thereby reducing the elevation of said tray when the legs are positioned within said planter housing with said tray atop said tray support.

10. The planter assembly of claim 1 wherein said tray has sides with a small concave curvature.

11. The planter assembly of claim 1 wherein said tray support is made from a plastic material.

12. The planter assembly of claim 1 wherein said top edge of said planter housing has a rounded configuration.

13. The planter assembly of claim 1 wherein positioning of said top edge of said tray is selected from the group consisting of positioning said top edge of said tray at an elevation placing it above said top edge of said planter housing, positioning said top edge of said tray at the same elevation as said top edge of said planter housing, and positioning said top edge of said tray at an elevation placing it below said top edge of said planter housing.

14. The planter assembly of claim 1 wherein said interior handle means comprises two handles in opposed positions from one another.

* * * * *